Sept. 28, 1971 W. D. BRADEN ET AL 3,608,412
TREAD SLITTER
Filed Jan. 19, 1970 5 Sheets-Sheet 1

INVENTOR.
WILLIAM D. BRADEN
LEONARD A. VANDALE
BY Harlan E. Hummer
ATTORNEY

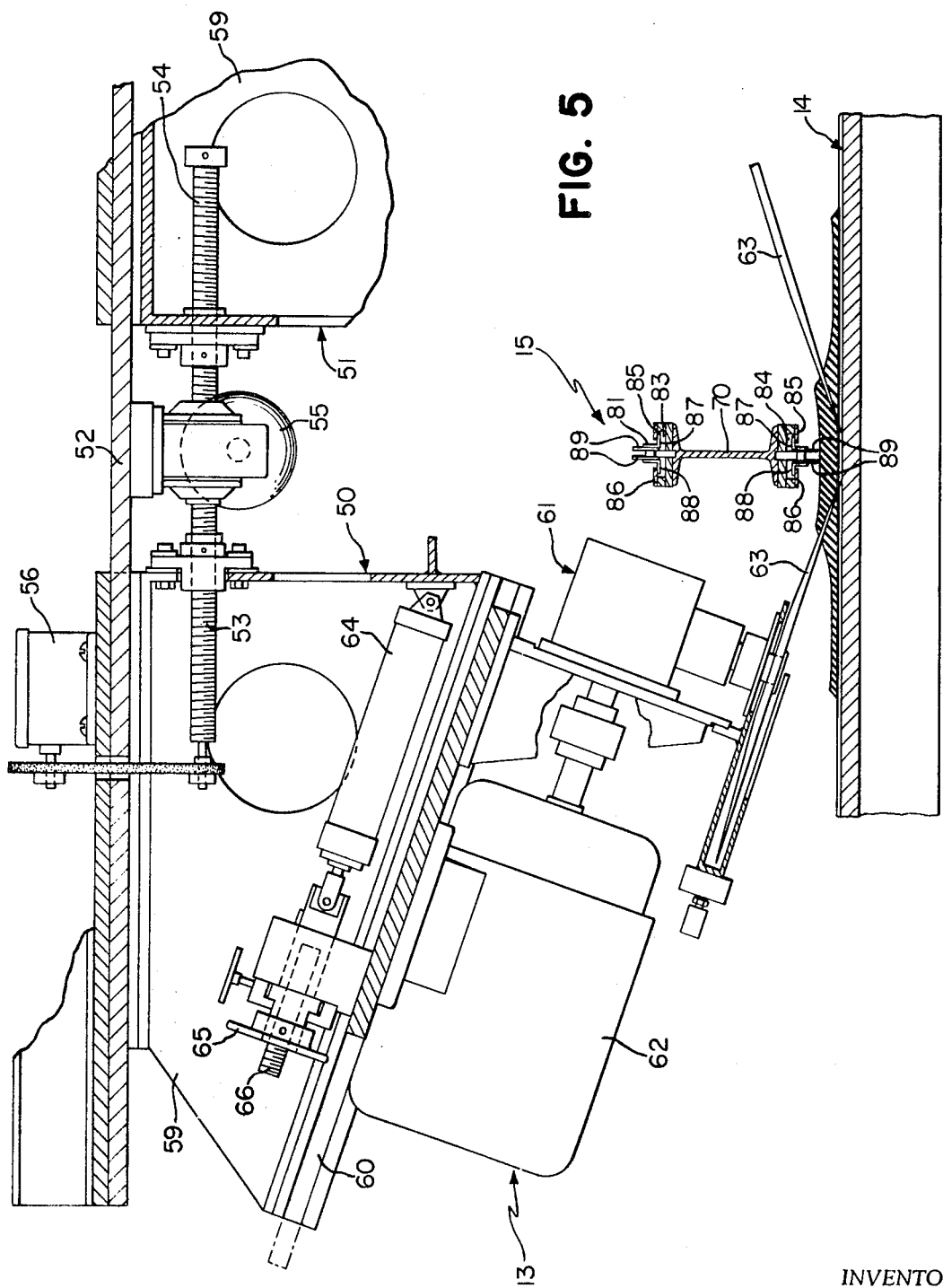

United States Patent Office 3,608,412
Patented Sept. 28, 1971

3,608,412
TREAD SLITTER
William D. Braden, Stow, and Leonard A. Vandale, Akron, Ohio, assignors to The Goodyear Tire & Rubber Company, Akron, Ohio
Filed Jan. 19, 1970, Ser. No. 3,709
Int. Cl. B26d 1/20
U.S. Cl. 83—107                    29 Claims

ABSTRACT OF THE DISCLOSURE

A machine for separating a pair of sidewalls from an extruded piece of tread including the sidewalls. The machine has a feed conveyor for carrying the extruded tread to a cutter where the sidewalls are cut from the tread, and a number of discharge conveyors for removing the individual pieces of tread and sidewall from the machine after the cutting operation is completed. A mechanism is provided for engaging the tread moving on the feed conveyor, and guiding it through the cutter and on to the discharge conveyor. The cutter and guide mechanism are mounted on an overhead trackway and are retractable from the conveyors, if there is a malfunction of the machine.

BACKGROUND OF THE INVENTION

A tread slitter, as the machine is commonly referred to, is designed to cut and remove a pair of sidewalls from an extruded piece of tread stock, including the sidewalls, used in the manufacture of pneumatic tires, and which for some reason is found defective but whose components are salvageable.

The tread and sidewalls are normally extruded in one continuous slab of material, which is then cut into individual pieces of predetermined length, depending on the size of the tire. The rubber compound of the tread is distinct from that of the sidewalls because of the different wear characteristics or requirements of each. Thus, when pieces of extruded tread and sidewall are discarded because of some particular defect, it is important to separate the tread from the sidewalls, if the individual pieces are to be reclaimed and reused in the extruding process. Otherwise, a variable mixture of tread and sidewall compound would result, which would be detrimental to the pneumatic tire. The particular machine, herein described, is designed to undercut the tread at an angle of about 20 degrees measured from the horizontal when the tread and sidewall are horzontally disposed, the reason being that during the extruding process the sidewalls are joined with the tread at this particular angle.

A piece of discarded tread stock, including the pair of sidewalls, is fed into the machine between two knives which cut the stock axially along the angular joint between the tread and sidewall compounds or material. After cutting, the individual components of tread and sidewall are removed from the machine. Many problems, such as feeding and guiding the tread stock through the machine, and cutting the sidewall from the tread, are encountered. Another problem encountered with some machines is the inaccessibility to pieces of tread and sidewall once the pieces enter the machine. In such machines, it is extremely difficult to remove the pieces if the machine malfunctions and stops operating. The invention is directed to alleviating many of these problems and in particular to providing a machine wherein the various assemblies for cutting and guiding the tread and sidewalls through the machine are retractable out of interfering relation to permit easy removal of the pieces from the machine when a malfunction occurs.

Briefly stated, the invention is in a machine for cutting or separating a pair of sidewalls from an extruded piece of tread stock including the sidewalls. The machine includes a pair of rotatable knives, which are movable laterally relative to the longitudinal axis along which the tread stock moves through the machine, and which can be raised and lowered relative to a feed conveyor for carrying the tread stock to the knives. A pair of parallel discharge conveyors are provided in offset material receiving relation to the feed conveyor for removing sidewalls which have been cut from the tread. A separate discharge conveyor is provided in parallel relation bewteen the two sidewall discharge conveyors for receiving and removing the tread after the sidewalls have been cut therefrom. An anvil is interposed between the feed conveyor and other conveyors for supporting the tread and sidewalls as they are cut by the knives. A mechanism is provided for engaging the tread stock and cooperating with the conveyors to guide the tread through the machine. The guide mechanism and knives are mounted in overhead relation to the conveyors and are retractable above the conveyors out of interfering relation for removing the tread stock when a malfunction of the machine occurs.

DESCRIPTION OF THE DRAWING

The following description of the invention will be better understood by having reference to the annexed drawing, wherein:

FIG. 5 is an enlarged partial end view showing the mechanism for retracting the cutting knives.

DESCRIPTION OF THE INVENTION

Figure 1:
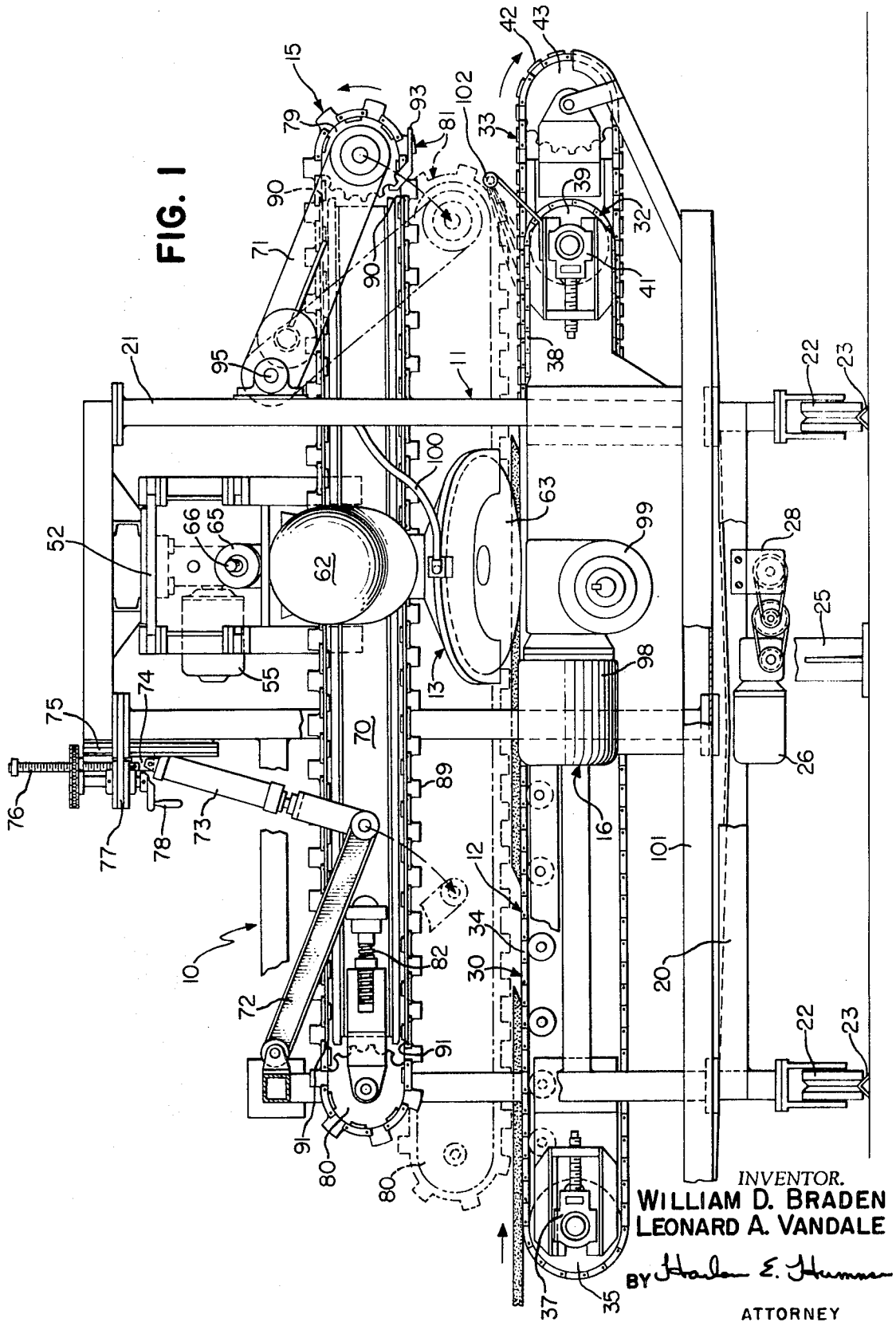
FIG. 1 is a side view of the tread slitting machine.
Figure 2:
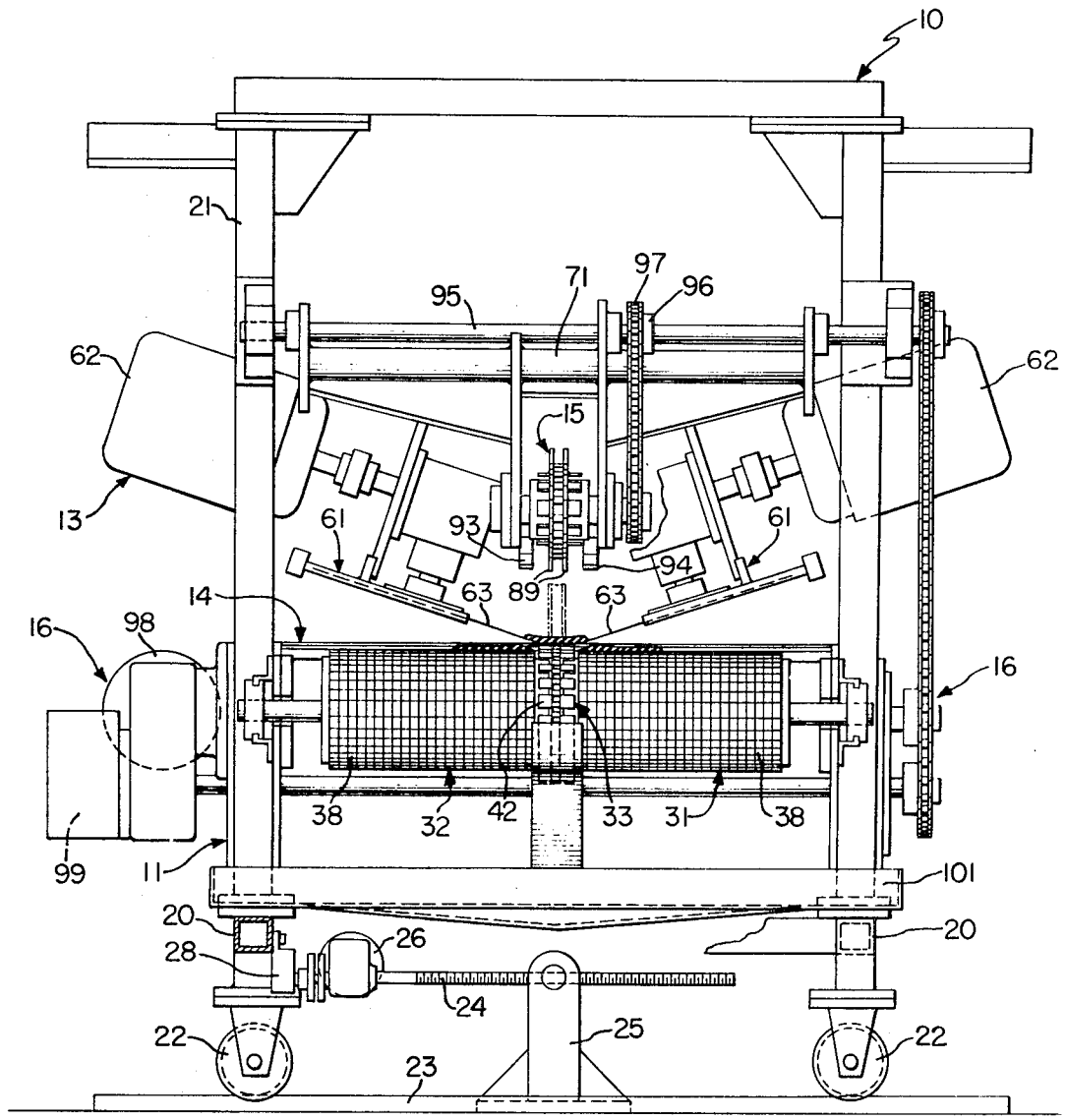
FIG. 2 is an end view of the machine.
Figure 3:
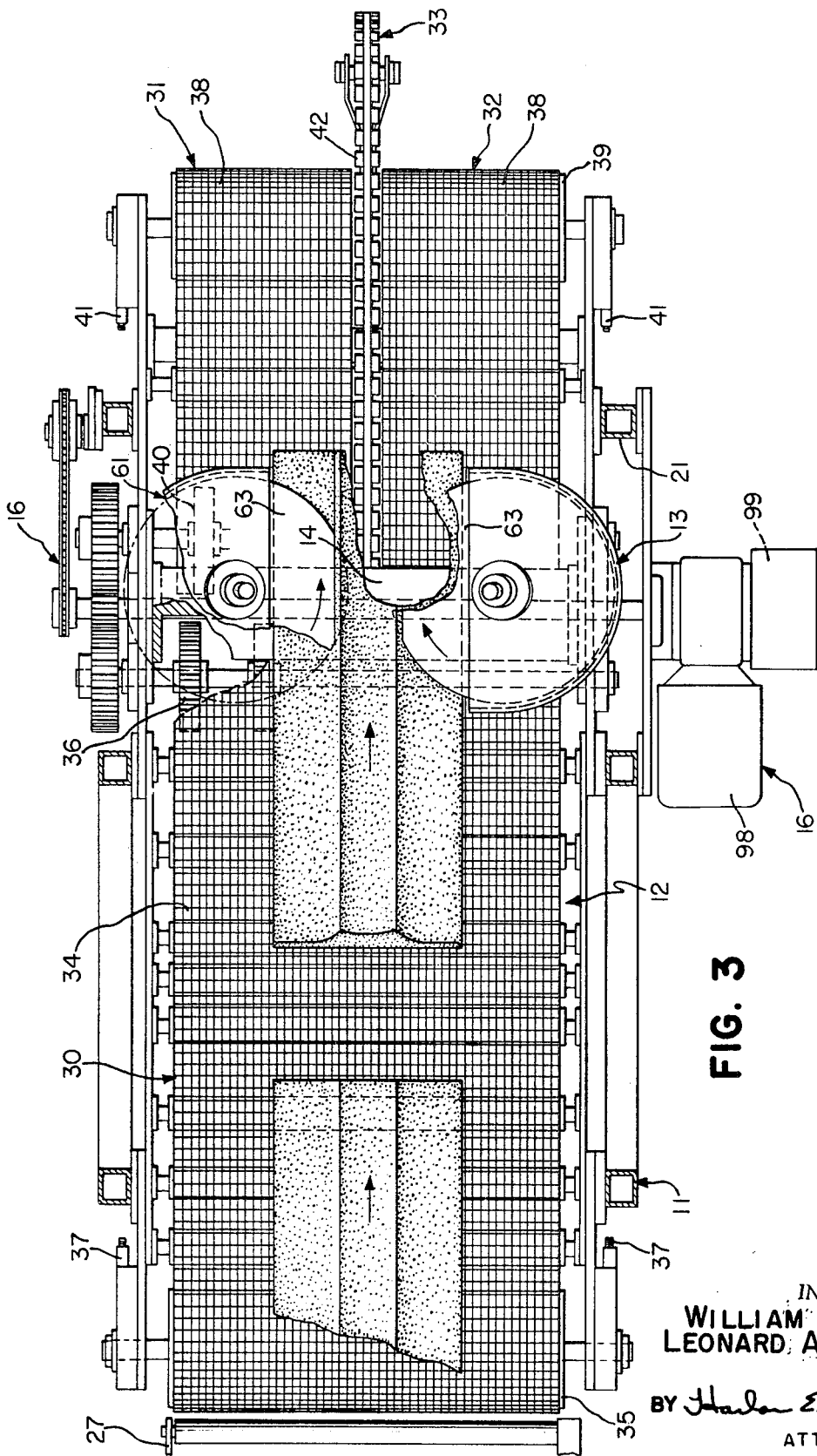
FIG. 3 is a plan view of the machine bed showing the knives cutting a piece of tread stock positioned on the conveyors of the machine.
Figure 4:
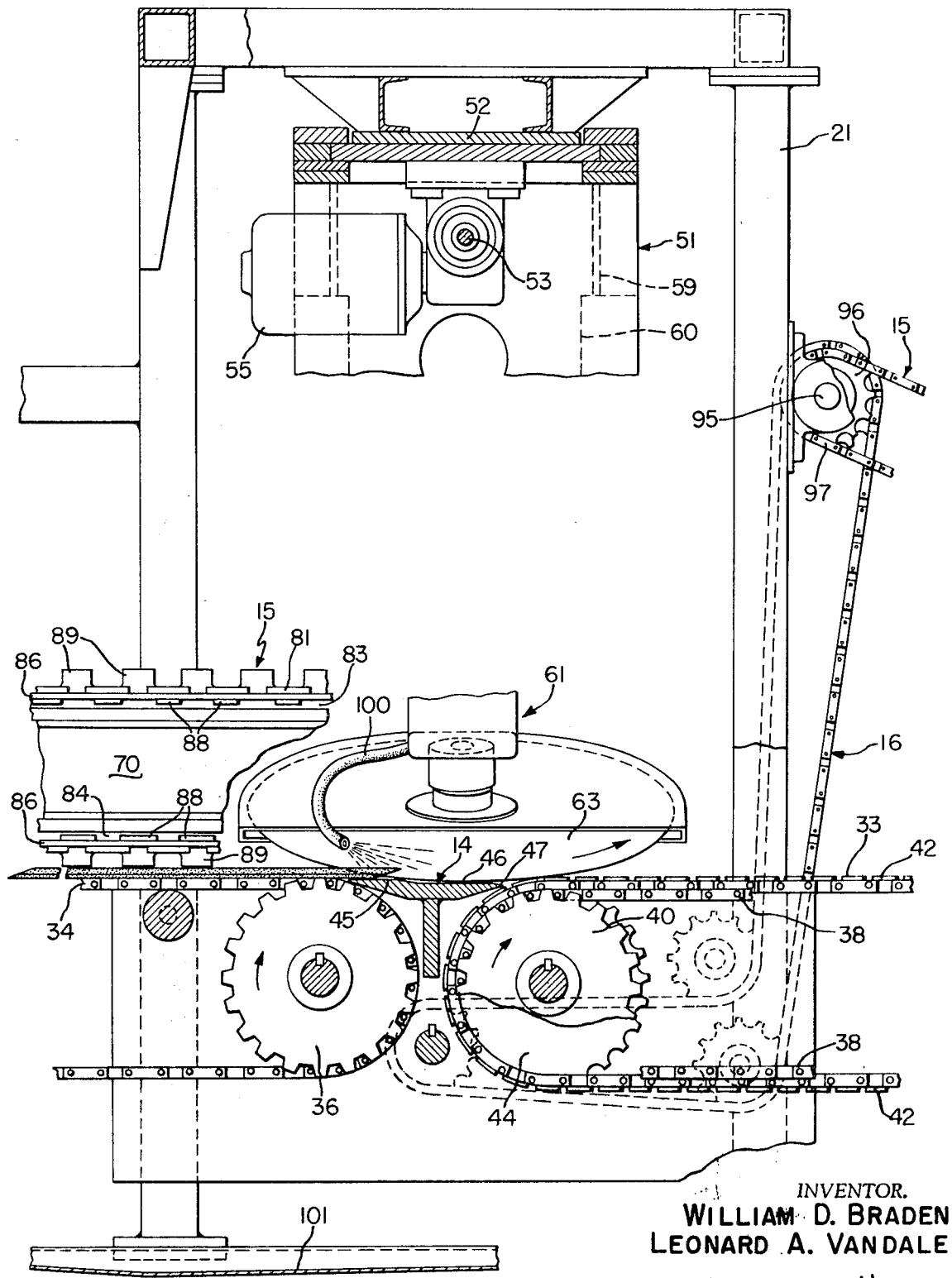
FIG. 4 is an enlarged partial side view showing, in cross-section, the anvil which supports the tread stock as it is being cut.

Referring more particularly to FIGS. 1 and 2 of the drawing, there is shown a tread slitting machine generally indicated at 10. The tread slitter 10 comprises a machine stand 11 on which are mounted, a conveyor assembly 12 for moving material through the machine 10; a cutter assembly 13 for cutting a pair of sidewalls from a piece of tread stock including the sidewalls; an anvil 14 interposed in the conveyor assembly 12 for supporting the tread and sidewalls as they are being cut; a guide assembly 15 for engaging the piece of tread and guiding it into proper cutting position as it moves through the machine 10 on the conveyor assembly 12; and a drive mechanism 16 for operating the conveyor assembly 12 and guide mechanism 15.

The machine stand 11 comprises a base or platform 20 for supporting an upstanding overhead frame 21. The platform 20 is mounted on several sets of casters 22, which are movable along similar guide rails 23. The platform 20 carries a drive screw 24, which threadably engages a bracket 25 mounted in fixed relation between the guide rails 23. An electric motor 26 is provided for operating or rotating the drive screw 24 to move the casters 22 along the guide rails 23 to laterally position the machine stand 11 relative to the longitudinal axis of an adjacent roller conveyor 27 on which pieces of tread stock are fed to the tread slitter 10.

A potentiometer 28 and voltmeter (not shown) are operatively connected to the electric motor 26 for sensing the lateral position of the tread slitter 10 on the guide rails 23, and a conventionally designed electrical button switch is utilized for starting and operating the electric motor 26.

Conveyor assembly

The conveyor assembly 12 (FIGS. 1–4) comprises a feed conveyor 30 for carrying or moving a piece of tread stock to the cutter assembly 13, a pair of parallel discharge conveyors 31 and 32 disposed in offset material receiving relation from the feed conveyor 30 for removing the sidewalls after they are cut from the tread, and a separate discharge conveyor 33 disposed in parallel relation between the sidewall discharge conveyors 31 and 32 and in material receiving relation from the feed conveyor 30 for removing the tread separately from the sidewalls after cutting.

The feed conveyor 30 comprises a continuous open wire mesh belt 34 reeved around a pair of elongated drive rollers 35 and 36, which are rotatably mounted in spaced relation on the machine platform 20. A number of freely mounted smaller rollers are provided for supporting the conveyor belt 34 between the drive rollers 35 and 36, such that the material supporting surface of the feed conveyor 30 is generally planar or flat. A manually operated take-up adjustment 37 is provided for moving the outer drive roller 35 to loosen or tighten the conveyor belt 34 on the feed conveyor 30.

Each of the sidewall discharge conveyors 31 and 32 are similarly constructed of a continuous open wire mesh belt 38 reeved around a pair of elongated drive rollers 39 and 40, which are mounted in spaced relation on the platform 20. A number of similar intermediate support rollers are freely mounted between the drive rollers 39 and 40, and used to provide a planar or flat material supporting surface, which is preferably parallel to the material supporting surface of the feed conveyor 30. A manually operated take-up adjustment 41 is also provided for moving the drive roller 39 to loosen or tighten the conveyor belt 38 on each of the discharge conveyors 31 and 32. The sidewall discharge conveyors 31 and 32 are in aligned material moving relation with the feed conveyor 30, and the material supporting surfaces thereof, are in lower offset relation from the material supporting surface of the feed conveyor 30.

The tread discharge conveyor 33 comprises a chain belt 42 reeved around a pair of drive wheels 43 and 44, which are mounted on the platform 20 in aligned relation between the sidewall discharge conveyors 31 and 32. The material supporting surface of the tread discharge conveyor 33 is preferably aligned and in the same plane as the material supporting surface of the feed conveyor 30. Thus, the sidewalls will drop away from the tread as they move on to their discharge conveyors 31 and 32 and the tread moves on to its discharge conveyor 33, thereby keeping the cutter from binding as it operates to cut the sidewalls from the tread.

The conveyors 30–33 are normally geared together for operating in unison and at the same speeds for moving the tread stock through the tread slitter 10. The tread discharge conveyor 33 extends beyond the material drop-off end of the sidewall discharge conveyors 31 and 32, such that an operator is not required to separate the individual pieces of sidewall from the tread.

Anvil

The anvil 14 (FIG. 4) is a solid piece of material for supporting the tread and sidewalls during the cutting operation, and is disposed between the adjacent axially spaced ends of the feed conveyor 30 and discharge conveyors 31–33. The anvil 14 has a flat surface 45, adjacent the feed conveyor 30, which is generally aligned and in the same plane as the material supporting surface of the feed conveyor 30, and a configured surface 46 extending in offset relation from the flat surface 45 toward the adjacent edges of the sidewall discharge conveyors 31 and 32. The edges 47 of the configured surface 46 closest the sidewall discharge conveyors 31 and 32, are in planar aligned relation with the material supporting surfaces of the conveyors 31 and 32. The anvil is at least coextensive with the width of the feed conveyor 30. The configured surface 46 provides a hollow or recess for receiving the adjacent tip of the rotating knife blade of the cutter assembly as hereinafter described.

Cutter assembly

The cutter assembly 13 (FIGS. 1–5) comprises a pair of oppositely disposed cutting devices 50 and 51 (FIG. 5), which are disposed in spaced overhead relation to the conveyors 30–33. The cutting devices 50 and 51 are slidably mounted on an overhead trackway 52, which is secured to the overhead machine frame 21 in parallel relation to the anvil 14. The overhead trackway 52, similar to the anvil 14, is transversely disposed to the axis along which the piece of tread stock moves through the tread slitter 10.

The cutting devices 50 and 51 are coupled to a pair of axially aligned drive screws 53 and 54, which are operated or rotated by the electric motor 55 secured to the overhead trackway 52 in vertically aligned relation with the longitudinal centerline of the tread slitter 10, which is coincidental with the centerlines of the guide mechanism 15, the tread discharge conveyor 33, the feed conveyor 30, and the centerline from which the sidewall discharge conveyors 31 and 32 are equally laterally spaced.

A potentiometer 56 and voltmeter (not shown) are operatively connected to the drive screw 53 for sensing the lateral position of the cutting devices 50 and 51 relative to the aforementioned centerline of the tread slitter 10, and a conventionally designed pushbutton switch is used to start and operate the electric motor 55 to laterally position the cutting devices 50 and 51 for cutting different width treads from the sidewalls.

Each of the cutting devices 50 and 51 comprises a frame 59 with a guideway 60, which lies in a plane angularly disposed to the plane of the material supporting surface of the feed conveyor 30. The angular disposition of the guideway is about 20 degrees, since the machine is a 20-degree tread slitter and designed for undercutting the tread at an angle of about 20 degrees to the horizontal when the tread is in a horizontal position (FIG. 5). A knife assembly 61 is slidably mounted on each guideway 60.

The knife assembly 61 comprises an electric motor 62, which is operated to rotate a knife 63 for cutting the sidewalls from the tread. The knife 63 is preferably a circular blade, which is rotatable in a plane parallel to the 20-degree plane of the guideway 60. A pneumatic cylinder 64 is mounted on the frame 59 and coupled to the knife assembly 61 for moving or reciprocating it along the angular guideway 60. Thus, the cutting knife 63 is raised or lowered relative to the anvil 14. Moreover, in cases where the tread slitter 10 malfunctions or stops operating, the pneumatic cylinder 64 acts to retract the knife assembly 61 out of interfering relation with removal of the piece of tread stock from the machine 10.

A manually operated crank 65 is rotatably mounted on the knife assembly 61 and is adjustable along a threaded screw 66 to finely adjust the position of the knife assembly 61 along the guideway 60, or the cutting tip of the rotating knife blade relative to the anvil 14. This particular adjusting mechanism is also utilized to compensate for wear on the knife blade 63 caused by resharpening the blade when it becomes dull and unsuitable for cutting.

Guide assembly

The guide assembly 15 (FIGS. 1–2) comprises an elongated guide beam 70, which is disposed in parallel overhead relation to the feed conveyor 30 and aligned tread discharge conveyor 33. The guide beam 70 is mounted on the overhead frame 21 for pantographing parallel movement relative to the feed conveyor 30 and tread discharge conveyor 33 by any suitable means, e.g. pivot arms 71 and 72. A pneumatic cylinder 73 is coupled between the overhead frame 21 and guide beam 70 for operating, or raising and lowering the beam 70 relative to the material supporting surfaces of the feed conveyor 30 and tread discharge conveyor 33. The position of the pneumatic cylinder 73 is vertically adjustable on the overhead frame 21 by any suitable means. For example, the pneumatic cylinder 73 is rotatably mounted on a guide block 74, which is slidably mounted for vertical movement along a guide rail 75. The guide block 74 is also coupled to an adjusting screw 76, which is threadably engaged in a bracket 77 secured to the overhead frame 21. A hand-operated crank 78 is provided for rotating the adjusting screw 76 to move the guide block 74 axially along the guide rail 75 and correspondingly move or shift the attached end of the pneumatic cylinder 73 vertically upward or downward to finely adjust the horizontal parallel position of the guide beam 70 relative to the feed conveyor 30 and tread discharge conveyor 33.

A pair of sprocket wheels 79 and 80 are rotatably mounted on the opposing ends of the guide beam 70. A continuous chain belt 81 is reeved around the sprocket wheels 79 and 80. A spring-biased take-up adjustment 82 is provided for moving the sprocket wheel 80 to tighten or loosen the chain belt 81.

A pair of elongated guide channels 83 and 84 (FIG. 5) are provided adjacent the upper and lower edges of the guide beam 70, to keep the chain belt 81 from sagging as it moves between the sprocket wheels 79 and 80. Each of the upper and lower channels 83 and 84 have inwardly directed ledges 85 and 86, which are continuous and coextensive with the guide channels 83 and 84. The chain belt 81 carries a number of oppositely disposed projecting flanges 87 and 88, which ride in supported, guided relation along the ledges 85 and 86 of the lower channel 84, as the chain belt 81 moves, adjacent and in the same direction as the feed and tread discharge conveyors 30 and 33.

A projection 89 is associated with each support flange 87 and 88 and extends from the chain belt 81 in a direction for engaging the piece of tread stock and helping guide it through the tread slitter 10. That is, the projections 89 forcibly or compressively engage the tread portion of the tread stock as it moves along the feed conveyor 30 and helps guide the tread stock between the cutting knives 63 and the tread portion on to the tread discharge conveyor 33. The opposing ends 90 and 91 of each guide channel 83 and 84 adjacent the sprocket wheels 79 and 80 are sloped to guide or deflect the belt flanges 87 and 88 into proper riding engagement along the ledges 85 and 86 of the channels 83 and 84.

The pneumatic cylinder 73 is double-acting in that fluid pressure can be exerted on either side of the enclosed piston. Differential pressures against the piston, can be used to counter-balance the guide beam 70, or make it seemingly weightless. That is, the guide beam 70 will correspondingly raise in response to any appreciable vertical force, which is applied against it. Thus, when a heavier tread passes through the tread slitter 10, the guide beam 70 will automatically compensate or adjust for the difference in thickness to keep the projections 89 from becoming embedded in the tread, which is undesirable, since the tread tends to stick to the projections 89 as the chain belt 81 moves around the rearward sprocket wheel 79. However, the projections 89 still forcibly engage the tread and compress it against the wire mesh belt 34 of the feed conveyor 30 which cooperates with the chain belt 81 of the guide mechanism 15 to move the tread stock in proper sidewall cutting orientation through the tread slitter 10. As a safety precaution, a set of stripper plates 93 and 94 are disposed on either side of the chain belt 81 adjacent the rearward sprocket wheel 79 of the guide assembly 15 for engaging and deflecting from the chain belt 81, any piece of tread which becomes embedded on the projections 89.

The pivot arm 71 (FIG. 2) for supporting one end of the guide beam 70, is a specially configured bridge and provides intermediate support for the pivot rod 95 which carries, in addition to the pivot arm 71, the drive pulley 96 and chain 97 for driving the sprocket wheel 79 to operate the chain belt 81 of the guide assembly 15.

Drive mechanism

The drive mechanism 16 (FIGS. 1–4) comprises an electric motor 98, which is conventionally geared to the conveyor assembly 12 and guide mechanism 15 for operating or moving the belts of the conveyors 30–33 and guide beam 70 in unison and in the same direction and at the same speed to keep the tread stock moving uniformly through the tread slitter 10. Separate slip clutches, e.g. slip clutch 99, are provided as a safety device in the gear trains operating the belts of the conveyor assembly 12 and guide mechanism 15. Should a piece of tread jam up operation of the machine, the operator attending the machine presses a conventionally designed button switch to initiate immediate retraction of the knives 63 and guide beam 70 from adjacent the conveyors 30–33, to a position where they are out of interfering relation with removal of the tread stock from the machine 10.

Thus, there has been provided a new and novel machine for separating sidewalls from a discarded piece of tread material including a pair of sidewalls. The machine is more readily adapted to automatic type operations, because of the different positions and movement of the operating mechanisms, which is especially useful in clearing the machine, or moving the tread engaging mechanisms out of interfering relation with removal of the tread and sidewalls, should a malfunction or stoppage of the machine occur. Any suitable fluid feeding system, e.g. conventional hose lines 100, can be utilized to supply fluid, e.g. water, under pressure to the cutting knives 63 and certain other components of the machine to facilitate cutting the sidewalls from the tread. A drip pan 101 is supplied on the base 20 for catching and draining water discharged from the fluid feeding system. A pipe 102 with a number of spaced jets or nozzles, spanning the discharge conveyors 31 and 32, is in communication with any suitable air compressor and acts as a blower for driving excess water from the tread, sidewalls, conveyors, etc. into the drip pan 101.

While certain representative embodiments and details have been shown for the purpose of illustrating the invention, it will be apparent to those skilled in the art that various changes and modifications may be made therein without departing from the spirit or scope of the invention.

What is claimed is:

1. A machine for cutting a sidewall from an extruded piece including a tread and at least one sidewall, comprising in combination:
   (a) at least one rotatable knife for cutting the sidewall from the tread;
   (b) a feed conveyor having a movable material supporting surface for carrying the tread and sidewall to the knife;
   (c) a discharge conveyor for removing cut sidewall from the knife, said conveyor having a movable material supporting surface in offset sidewall receiving relation to the material supporting surface of the feed conveyor;
   (d) a discharge conveyor for removing tread from the knife after the sidewall is cut therefrom, said conveyor having a movable material supporting surface in tread receiving relation to the material supporting surface of the feed conveyor;
   (e) an anvil interposed between the feed and discharge conveyors for supporting the tread and sidewall as they are cut by the knife; and
   (f) means for engaging the tread on the feed conveyor and guiding it into cutting relation with the knife and on to the tread discharge conveyor.

2. The machine of claim 1, which includes:
   (g) a trackway disposed in overhead, parallel relation to the anvil, the longitudinal axis of the overhead trackway being angularly disposed to the axis along which the tread moves through the machine; and
   (h) means for moving the knife along the overhead trackway to position the knife laterally relative to the axis along which the tread moves through the machine.

3. The machine of claim 2, wherein the tread guiding means (f) includes:
   (i) a continuous chain belt movable in unison with, and in the same direction as the material supporting surfaces of the feed and discharge conveyors;
   (k) means for maintaining the belt in a generally straight pathway parallel to the material supporting surfaces of the feed conveyor;
   (m) a plurality of projections carried by the chain belt and extending in spaced relation from the belt for engaging the tread; and
   (n) means for lowering and raising the chain belt in parallel relation towards and away from the material supporting surface of the feed conveyor to varying the spacing between said surfaces and free ends of the projections.

4. The machine of claim 2, which includes:
   (o) a guideway angularly disposed to the overhead trackway; and
   (p) means for moving the knife along the guideway to lower and raise the knife towards and away from the anvil.

5. The machine of claim 2, wherein the anvil includes:
   (q) a first surface adjacent the feed conveyor and generally aligned with the material supporting surface of the feed conveyor; and
   (r) a second surface extending in offset relation from the first surface and in a direction toward the material supporting surface of the sidewall discharge conveyor.

6. The machine of claim 2, which includes:
   (s) means for mounting the knife for cutting the tread and sidewall in a plane which is disposed at an angle of about 20° measured from the plane of the material supporting surface of the anvil.

7. The machine of claim 2, which includes means for retracting the knife and tread guiding means (f) from the conveyors to a position out of interfering relation with removal of tread and sidewall from the machine.

8. The machine of claim 7, which includes means for stopping the conveyors prior to, and at most simultaneously with retraction of the knife and tread guiding means (f).

9. The machine of claim 2, which includes means for positioning the machine laterally relative to an axis along which movement of the tread is desired.

10. The machine of claim 3, wherein the means (k) includes an elongated rigid channel with at least one supporting ledge and a flange carried by each projection for supported, riding engagement along the support ledge of the channel.

11. The machine of claim 3, wherein the belt raising and lowering means (n) includes means for counterbalancing the chain belt, such that any appreciable force applied against the belt in a belt raising or lowering direction causes movement of the belt to accommodate treads having different thicknesses measured in a direction normal from the plane of the anvil.

12. A machine for cutting sidewalls from an extruded piece including a tread and pair of sidewalls, comprising in combination:
   (a) a pair of rotatable knives of cutting the sidewalls from the tread;
   (b) a feed conveyor having a movable material supporting surface for carrying the tread and sidewalls to the knives;
   (c) a pair of parallel discharge conveyors operable in unison with the feed conveyor for removing cut sidewalls from the knives, said conveyors movable in the same direction as the feed conveyor and having material supporting surfaces in offset lower sidewall material receiving relation to the material supporting surface of the feed conveyor;
   (d) a separate discharge conveyor disposed in parallel relation between the sidewall discharge conveyors and movable in unison with, and in the same direction as the sidewall discharge conveyors for removing tread from the knives after the sidewealls are cut therefrom, said tread discharge conveyor having a material supporting surface in tread receiving relation to the material suppoting surface of the feed conveyor;
   (e) an anvil interposed between the feed and discharge conveyors for supporting the tread and sidewalls as the sidewalls are cut from the tread;
   (f) means cooperating with the feed and tread discharge conveyors for guiding the tread axially through the machine, said means including:
      (1) a continuous chain belt movable in unison with, and in the same direction as the material supporting surfaces of the feed and discharge conveyors move;
      (2) means for supporting the belt in parallel relation to the plane of the material supporting surface of the feed conveyor;
      (3) means for lowering and raising the belt in parallel relation towards and away from the plane of the material supporting surface of the feed conveyor;
      (4) a plurality of projections carried by the belt in spaced relation for compressively engaging the tread;
   (g) a trackway disposed in overhead parallel relation to the anvil and transversely disposed to the axis along which the tread moves through the machine;
   (h) means for mounting the knives for movement along the overhead trackway;
   (i) means for varying the position of the knvies along the overhead trackway to vary the cutting position of the knives laterally relative to the axis along which the tread moves to accommodate different width treads;
   (j) a pair of guideways intermediate the overhead trackway and anvil and angularly disposed to the plane of the material supporting surface of the anvil, said guideways converging in a direction towards the anvil;
   (k) means for mounting the knives for movement along the overhead guideways; and
   (m) means for varying the position of the knives along the overhead guideway to finely adjust the cutting tip of the knives relative to the anvil.

13. The machine of claim 12, wherein the anvil includes a first surface adjacent the feed conveyor in generally aligned relation with the material supporting surface of the feed conveyor, and a second surface extending in offset relation from the first surface and in a direction toward the material supporting surfaces of the sidewall discharge conveyors.

14. The machine of claim 13, wherein the belt supporting means (2) includes:
   (5) a rigid channel having at least one supporting ledge; and
   (6) a flange carried by each projection for supported, riding engagement along the support ledge of the channel.

15. The machine of claim 14, which includes means for retracting the knives and chain belt of the tread guiding means (f) from the conveyors to a position out of interfering relation with removal of tread and sidewall from the machine.

16. The machine of claim 15, which includes means for stopping the conveyors prior to, and at most simultaneously with retraction of the knives and chain belt.

17. The machine of claim 16, wherein the belt raising and lowering means (3) includes means for counterbalancing the chain belt, such that any appreciable force applied against the belt in a belt raising or lowering direction causes movement of the belt to accommodate treads having different thicknesses measured in a direction normal from the plane of the anvil.

18. The machine of claim 17, which includes means for adjusting the minimum spacing between the material supporting surfaces of the feed conveyor and adjacent free ends of the projections.

19. The machine of claim 18, which includes means for positioning the machine laterally relative to an axis along which movement of the tread is desired.

20. The machine of claim 19, which includes means for supplying lubricant to the cutting knives for facilitating cutting the tread and sidewall.

21. A machine for cutting sidewalls from an extruded piece including a tread and pair of sidewalls, comprising:
(aa) a pair of rotatable knives disposed in spaced relation;
(a) means for supporting the tread in generally aligned planes as it moves towards and away from the knives that cut the sidewalls from the tread;
(b) means cooperating with the support means for guiding the tread through the machine, said means including:
(c) an elongated frame having opposing ends;
(d) a pair of sprocket wheels rotatably mounted adjacent the ends of the frame;
(e) a continuous belt reeved on and around the sprocket wheels and movable parallel to the support means;
(f) means for driving the belt;
(g) means for maintaining the belt in a generally straight pathway adjacent the support means;
(h) a plurality of projections carried by the belt and extending in spaced relation therefrom for engaging a tread on the support means; and
(i) means for raising and lowering the belt in parallel relation to the support means.

22. The machine of claim 21, which includes:
(j) means for adjusting the minimum spacing between the support means and adjacent free ends of the projection.

23. The machine of claim 22, wherein the means (g) includes:
(k) a channel disposed on the frame intermediate the sprocket wheels, the channel having at least one support ledge; and
(m) a flange associated with each projection for supported, riding engagement along the ledge of the channel.

24. The machine of claim 23, which includes:
(n) a second similar channel for supporting the belt as it moves from one sprocket wheel to another in farthest parallel relation from the support means.

25. The machine of claim 24, which includes:
(o) means adjacent each end of the channels for guiding the flanges into supported, riding engagement along the ledge of the channel.

26. The machine of claim 25, wherein the belt raising and lowering means includes means for counterbalancing the frame and belt such that any appreciable force applied against the belt in a belt raising and lowering direction causes movement of the belt to accommodate treads having different thicknesses measured in a direction normal to the support means.

27. The machine of claim 26, which includes means for retracting the frame from the support means to a position out of interfering relation with removal of tread from the machine.

28. The machine of claim 2 which includes means for varying the lateral position of the machine relative to an axis along which pieces of tread and sidewall move towards the machine.

29. The machine of claim 28 wherein the means for varying the lateral position of the machine includes:
(p) a trackway disposed at right angles to the longitudinal axis of the feed conveyor;
(q) means for mounting the machine for movement along the trackway; and
(r) means for sensing the position of the machine on the trackway.

References Cited
UNITED STATES PATENTS

| | | | |
|---|---|---|---|
| 1,319,301 | 10/1919 | Nall | 83—4 |
| 1,805,688 | 5/1931 | Davis | 83—3 |
| 2,696,884 | 12/1954 | Mishler et al. | 83—169X |
| 2,789,593 | 4/1957 | Leupold | 83—432X |
| 3,205,743 | 9/1965 | Langenberg et al. | 83—472X |

WILLIAM S. LAWSON, Primary Examiner

U.S. Cl. X.R.

18—2J; 83—169, 432, 433, 472, 477, 491, 508, 581, 923, 925